United States Patent
Ashe et al.

(10) Patent No.: US 6,847,393 B2
(45) Date of Patent: Jan. 25, 2005

(54) METHOD AND SYSTEM FOR MONITORING POINT OF SALE EXCEPTIONS

(75) Inventors: Christopher Ashe, Duluth, GA (US); Scott Fairbairn, Alpharetta, GA (US); Andrew Wren, Atlanta, GA (US)

(73) Assignee: Wren Technology Group, Jefferson City, MO (US)

( * ) Notice: Subject to any disclaimer, the term of this patent is extended or adjusted under 35 U.S.C. 154(b) by 39 days.

(21) Appl. No.: 10/125,587

(22) Filed: Apr. 19, 2002

(65) Prior Publication Data

US 2003/0197782 A1 Oct. 23, 2003

(51) Int. Cl.[7] .............................................. H04N 9/47
(52) U.S. Cl. ...................................... 348/61; 348/143
(58) Field of Search ......................... 348/61, 143, 151, 348/152, 156, 150, 161; 360/14.1, 14.2, 14.3; 386/4, 52, 46; 10/506, 3.1, 511; 700/17, 83, 318; H04N 7/18

(56) References Cited

U.S. PATENT DOCUMENTS

| | | |
|---|---|---|
| 4,145,715 A | 3/1979 | Clever |
| 4,337,482 A | 6/1982 | Coutta |
| 4,630,110 A | 12/1986 | Cotton et al. |
| 5,216,502 A | 6/1993 | Katz |
| 5,895,453 A * | 4/1999 | Cook ............................ 705/22 |
| 5,915,069 A * | 6/1999 | Nishijima ..................... 386/112 |
| 6,035,341 A | 3/2000 | Nunally et al. |
| 6,075,560 A * | 6/2000 | Katz ............................ 348/150 |
| 6,330,025 B1 * | 12/2001 | Arazi et al. .................. 348/143 |
| 6,421,080 B1 * | 7/2002 | Lambert ...................... 348/143 |
| 6,542,075 B2 | 4/2003 | Barker et al. |
| 2002/0075307 A1 | 6/2002 | Alexander et al. |
| 2002/0143923 A1 | 10/2002 | Alexander |

OTHER PUBLICATIONS

PCT International Searching Authority (ISA)/US, PCT International Search Report, International Application No. PCT/US03/10771, Date of actual completion: Jun. 13, 2002, Date of mailing: Jul. 22, 2003, Washington, DC.

* cited by examiner

Primary Examiner—Nhon Diep
(74) Attorney, Agent, or Firm—Dority & Manning, P.A.

(57) ABSTRACT

A method and system for monitoring point of sale exceptions includes the ability to proactively and automatically analyze POS transactional data for certain patterns or occurrences that typically indicate specific behavior at or near a POS terminal in connection with a sales related operation, retrieve time-correlated video segments of a specified length of time from a camera source associated with the POS terminal used to execute aforementioned transaction, and present the video and transaction data together without obstruction on the same user display for contemporaneous review.

31 Claims, 11 Drawing Sheets

1. Exception Header with key information

2. Broken into 3 areas: Overview, Notes and Video Segments associated to this event 3. Key Event information from the transaction 4. Link to Notes on the Employee 5. An acutal view of the POS data for the entire transaction 6. Timeslice of digital video correlated to the specific Event 7. Button to mark the Event as "Reviewed"

METHOD AND SYSTEM FOR MONITORING POINT OF SALE EXCEPTIONS

BACKGROUND OF THE INVENTION

1. Field of the Invention

Aspects of the present invention concern a platform to integrate data from multiple systems including, but not limited to, POS, video, EAS, alarm systems. etc. Some embodiments of the present invention relate to digital video recording and surveillance systems. More specifically, some embodiments of this invention relate to automated correlation of video data from digital recording video recording and surveillance systems with asynchronous transactions data from one-to-many discrete inputs.

2. Discussion of the Related Art

In the retail environment, certain types or patterns of employee or customer behavior at the register can be closely associated with fraud, theft or insufficient training. In addition, customer behavior at the resister is invaluable data for merchandizing and marketing. These types of behavior generally result in a monetary loss by the owner of the retail business. Analyzing point of sale (POS) data and searching for questionable behavior is gaining popularity among large retail organizations but is typically not practiced by less sophisticated organizations. Many organizations outsource this analysis and refer to it as "Data Mining" or "Exception Reporting". In-house or third party systems presently in place are somewhat cumbersome and inefficient. The process of collecting the data from a multitude of geographically diverse locations, analyzing the data according to rigid guidelines, producing a written report, and distributing the written report can take several days and be very expensive. Further, the distributed Exception Reports are not tied to video data captured by surveillance systems in the store, as will be discussed in greater detail below.

For example, the use of surveillance systems to record cash transactions for later review well known in the art. For example, in U.S. Pat. No. 4,337,482 issued to Coutta, can be understood to disclose a surveillance system that monitors and records transactions that occur at a number of cashier lanes. In Coutta, a single television camera, mounted on a rail, can be positioned to make a video recording of the transactions that occur at a single selected cashier lane. Coutta discloses that the digital transaction data from the cash register in the selected cashier lane is fed into a video character generator to provide a composite video picture in which an alphanumeric display of the transaction data overlays the video image of the transaction. Since a composite video image is generated with respect to only one cashier lane, it is usually possible to position the camera so that the alphanumeric overlay does not obscure a useful portion of the recorded video image. However, if a single camera is used to simultaneously record transactions occurring at a plurality of cashier lanes, it is likely that the alphanumeric overlay data will obscure important parts of the video image of at least one of the cashier lanes. This likelihood is further increased when a large number of parameters are displayed simultaneously for all of the cashier lanes.

U.S. Pat. No. 4,630,110, issued to Cotton et al., suggests a surveillance system that monitors and records a single lane using a plurality of video cameras. In one embodiment, the video image from four cameras may be combined wherein two of the cameras are focused on cash registers. Cotton et al. discloses that textual data can be displayed at the lower portion of the combined video picture.

Another surveillance system disclosed in U.S. Pat. No. 4,145,715, to Clever, is understood to generate two levels of surveillance records. The first level, generated by a tape recorder, contains a record of all transactions. The second level generated on the tape recorder contains only selected transactions. In Clever, transaction data such as the price and department number are input to a character generator. The character generator output is mixed with the video image to create a composite video frame. This composite video frame consists of alphanumeric transaction data which overlays the transaction video image. This composite video frame is then recorded by the video tape recorder onto video tape.

Although Clever discloses that a single camera can be used to scan several point-of-sale (POS) stations, the generated video image contains alphanumeric transaction data that is permanently overlaid on the video image. This is because the composite video frame is generated before recording on video tape. This overlay can degrade the clarity of the resultant video images if the transaction data is placed over the video image corresponding to a particular cashier lane. Alternatively, a portion of the video may be blacked out so that the transaction data can be more easily read when viewed at a later time on the monitor. In this instance, the blacked out portion is recorded over a portion of the image being recorded by the television camera. In this situation, the portion of the video image which was blacked out is lost forever.

As the devices that perform data entry (cash registers, data terminals, optical character readers, radio frequency readers, magnetic media readers, and many other like input devices. etc.) become more sophisticated, larger quantities of alphanumeric characters describing the transaction are generated. The clarity of the video image of a transaction is particularly important when the transaction lanes are outdoors and are recorded under varying light and weather conditions. The increase in information tends to clutter and obscure the composite video image. As the number of lanes being recorded increases, it becomes more difficult to overlay all of the alphanumeric transaction data at positions that will not obscure important parts of the video transaction image.

As suggested by Katz in U.S. Pat. No. 5,216,502, transaction data and video pictures associated with the transaction data are recorded separately and synchronously on media capable of storing a full motion video.

The references described above all require that the transaction data be available at the time that the behavior is being recorded. However, there are certain applications where this technology cannot be applied, for example, in situations where the point-of-sale system buffers the transaction data until the termination of the transaction, or at the termination of several transactions, or when an event is associated after the transaction has occurred. At the end of the transaction, the data is transmitted from the terminal to the host. Accordingly, the transaction information cannot be recorded synchronously with the video pictures of the transaction.

SUMMARY OF THE INVENTION

Accordingly, the present invention is directed to a method and system for monitoring point of sale exceptions that substantially obviates one or more of the problems due to limitations and disadvantages of the related art.

Some embodiments of the present invention provide improved surveillance system and security practices. Some embodiments of the present invention further provide extended utility and access to video data for uses other than security such as related to merchandising and marketing, research of products, transactional environment, customer service effects. etc.

It should be further appreciated that some embodiments of the present invention provide the ability to proactively and automatically analyze event transactional data for certain patterns or occurrences that typically indicate specific behavior at or near a POS terminal in connection with a sales related operation, retrieve time-correlated video segments of specified lengths of time from a camera source associated with the POS terminal used to execute aforementioned transaction, and presents the video and transaction data together without obstruction on the same user display for contemporaneous review in a proactive manner determined by system definitions.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for detecting fraud in a transactional environment includes—capturing video data of behavioral events corresponding to a predetermined transaction, storing the generated video data in a first predetermined storage medium, generating data corresponding to the predetermined transaction, storing the generated data in a predetermined storage medium, determining event occurrences within the generated data, and proactively generating user-defined exception when a number of events within the generated data exceeds a predetermined threshold number of events. The user-defined exception includes selected time-synchronized data with respect to the determined event occurrences and the corresponding video.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

The present invention integrates legacy systems (e.g., POS terminals, CCTV video surveillance systems, EAS, fire alarms, etc.) from transactional environments and correlates information outputs from each of the legacy systems in a pro-active and meaningful way. Synergistic results stemming from the aforementioned integration include the ability to identify repetition of patterns of certain events that are indicative of fraud, theft, or inadequate training, and that warrant further investigation. Non-inclusive exemplary transactional environments include grocery stores, convenience stores, mass merchandise stores, specialty stores, music stores, home improvement stores, pawn shops, and other related markets. Typical targets for video surveillance cameras include check out lanes, building entry and exit points, shopping aisles, customer services desks, specialty departments, etc. Some embodiments of the present invention combine video and data in the transactional environment.

The method and medium by which manufacturers of cash register and other POS terminals format, transmit, and store transactional data is extremely diverse. As described above, some POS terminals immediately transmit the transaction data to their POS host/controller immediately after every item is scanned or entered. Other POS terminals hold or buffer the information in an internal memory until a certain time or until a buffer reaches a time or space threshold before transmitting the transaction data to the POS host/controller. POS terminals typically assemble and use data in a proprietary structure and format. Being capable of reading the data generated from one POS terminal does not ensure the ability to read data from another POS terminal. The present invention incorporates a flexible design accommodating open compatibility with a plurality of POS terminals and operational methodologies.

Figure 1:
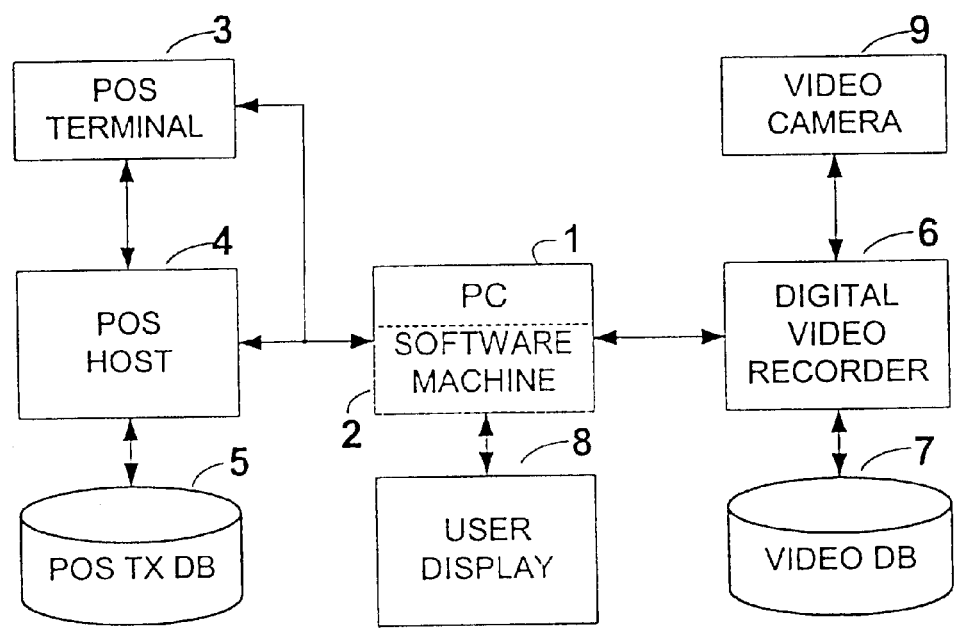
FIG. 1 is a schematic block diagram illustrating a configuration for POS related functions according to one embodiment of the present invention.

FIG. 1 illustrates a schematic block diagram of a configuration for POS related functions according to one embodiment of the present invention.

Sales related transactions within Point-of-Sales (POS) systems are generally executed using a POS terminal 3. Transactional data indicative of the sales related transactions is stored in an internal memory (not shown) of the POS terminal 3 before it is transmitted to the POS host/controller 4. Transmission of the transactional data may be either a batch process or a real-time process. The POS host/ controller 4 then stores the transactional data in POS transmission database (POS TX DB) 5 for future use.

Video cameras 9 (e.g., CCTV surveillance cameras, etc.), in one aspect of the invention, may generally include a plurality of video cameras pointed at various targets within the retail environment and provide a central vantage point of viewing elements within a transactional environment (e.g., employees, registers, doors, consumers, merchandise, etc.). Conventionally, analog video signals generated by video cameras are received by a multiplexing device and are further recorded on magnetic tape using a Video Cassette Recorder (VCR). In accordance with one aspect of the present invention, analog video signals generated by the video cameras 9 are received by analog to digital conversion technology for recording digital video data on digital media (e.g., magnetic hard drive, etc.) using a digital video recorder 6. A digital version of the video generated by the video camera in the video security system 9 is stored in a video database 7. In accordance with an alternate aspect of the present invention, digital video signals generated by the video cameras 9 may be received directly into the digital video recorder.

Transaction data from the POS TX DB 5 and digital video images from the video database 7 are integrated and made useable together via a computer 1 (e.g., a standard personal computer, IBM, Macintosh, etc.) supporting a software machine 2. The software machine 2 manages network connections (e.g., TCP/IP via Ethernet LAN topology, etc.) with the POS host/controller 4 and the digital video recorder to acquire the POS transactional data and digital video data, respectively. The software machine 2 allows users to access the system of the present invention for configuration and operation via web-based software running on a user display 8. In one aspect of the present invention, the software machine 2 has the capability to support either a single or many user displays via local network connection (e.g., TCP/IP via Ethernet LAN topology) or remote network connection (e.g., TCP/TP Internet, Intranet, Extranet, VPN or Dial connection.)

Figure 2:
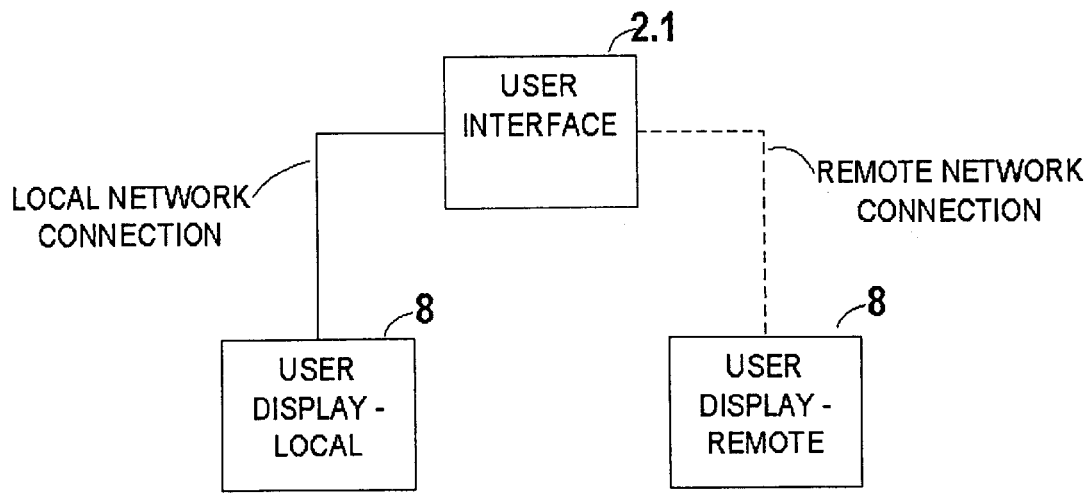
FIG. 2 is a schematic block diagram of the user interface portion of the software machine referenced in FIG. 3.
Figure 3:
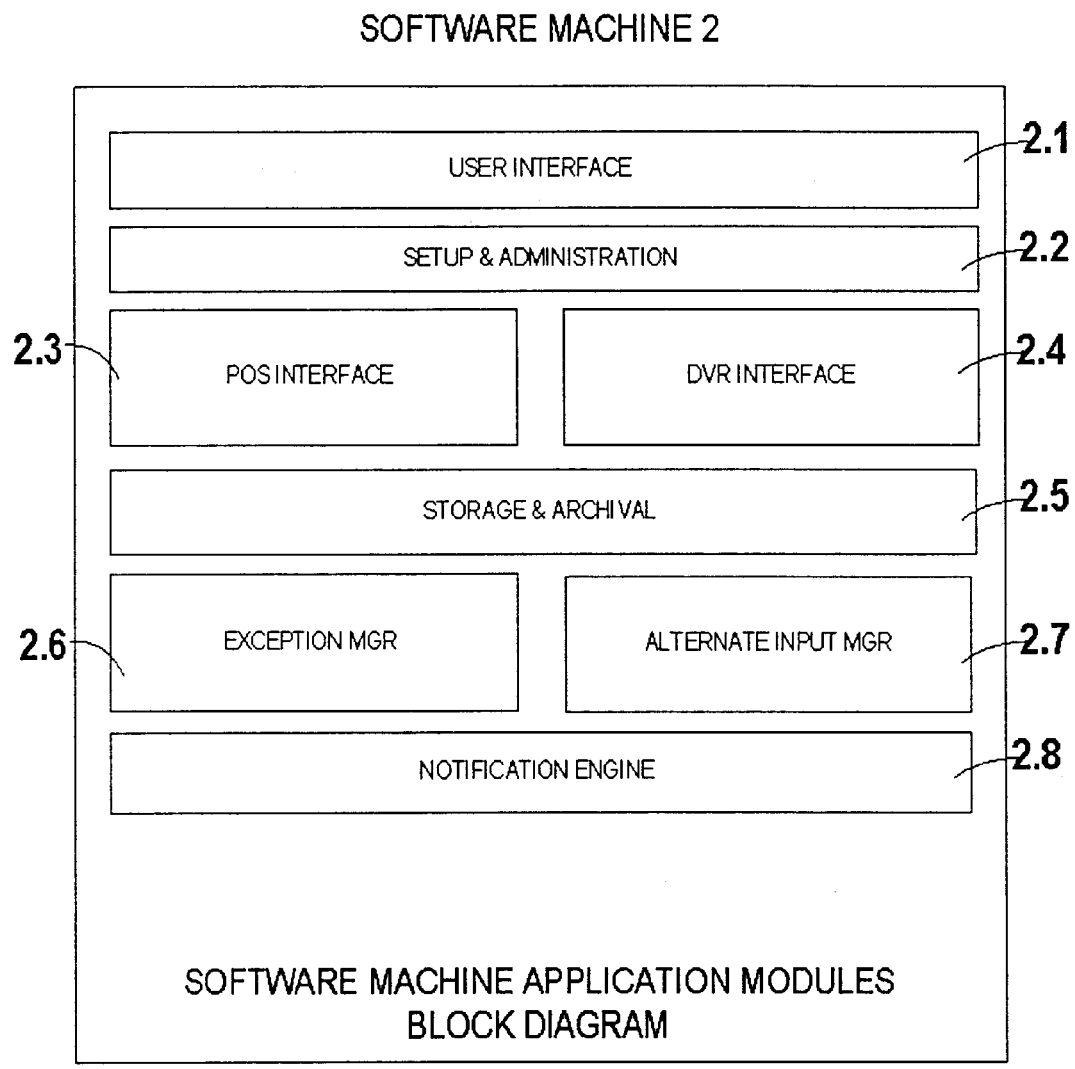
FIG. 3 is a schematic block diagram that identifies the various components comprising the software machine referenced in FIG. 1 and FIG. 6.

FIG. 2 illustrates a schematic block diagram of a user interface portion 2.1 of the software machine 2, as will be further referenced in FIG. 3, and its relationship with the user display(s). The user interface 2.1 may be provided, for example, as a web browser client running on the computer 1 connected to the user display 8 of the present invention via appropriate network connections (e.g., local or remote).

Referring now to FIG. 3, a schematic block diagram is illustrated identifying the various components of the software machine 2.

The software machine may be constructed as a web application running in host mode that includes a user interface 2.1, a setup and administration module 2.2, a POS interface 2.3, a digital video recorder (DVR) interface 2.4, storage and archival engine 2.5, an exception manager 2.6, an alternate input manager 2.7, and a notification engine 2.8.

Figure 4:
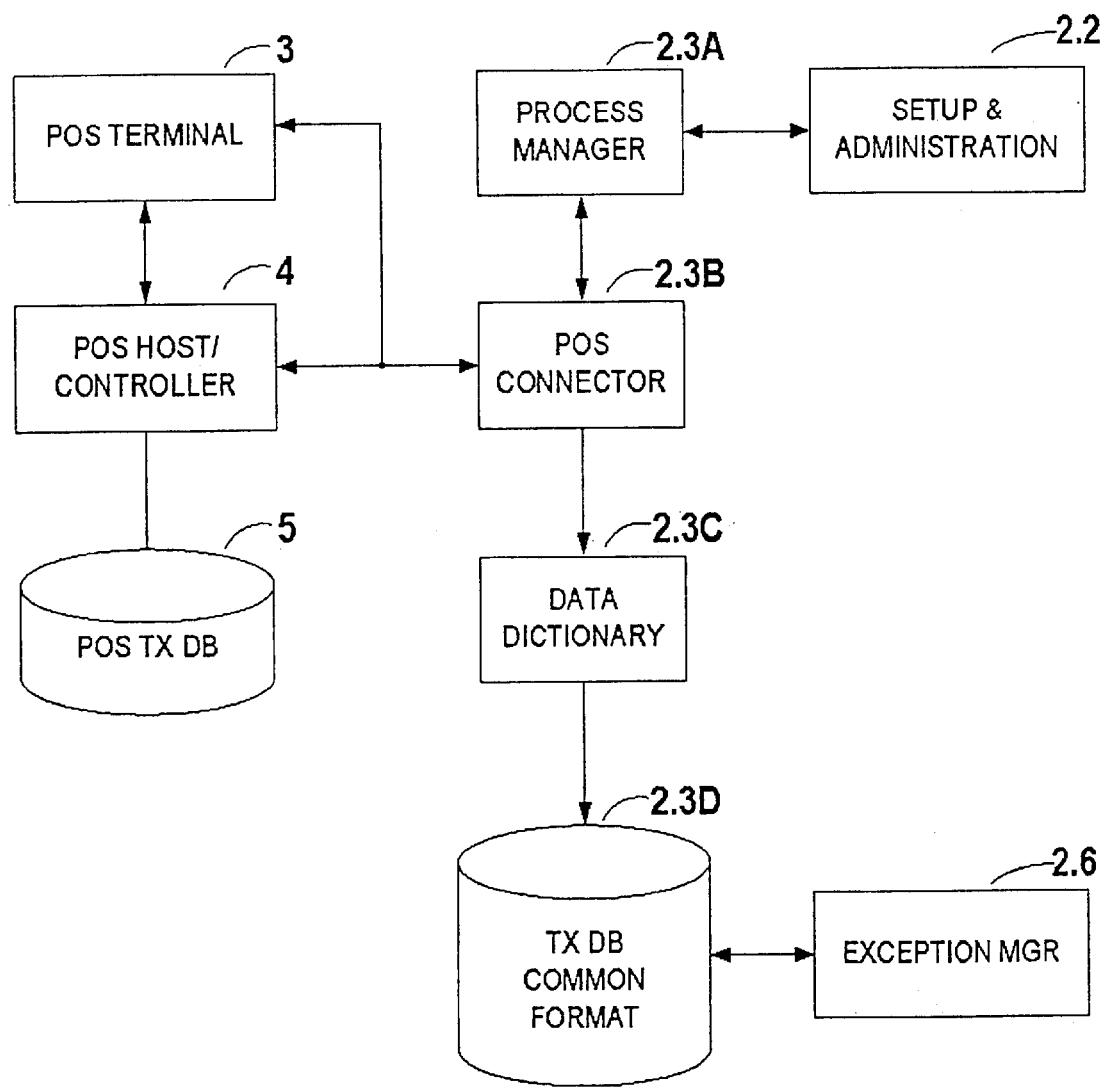
FIG. 4 is a schematic block diagram of the POS interface portion of the software machine referenced in FIG. 3.

With reference to FIG. 4, the POS interface 2.3 of the software machine 2 will now be discussed in greater detail.

The POS interface 2.3 within the software machine 2 may be generally treated as a switched virtual connection (SVC) that operates as a background service running on the computer 1 and includes a POS process manager 2.3A that oversees the operations of the POS interface portion of the software machine 2, a POS connector 2.3B that acts as the primary means of acquiring transactional data from the POS TX DB 5 by managing a network connection with the POS host/controller 4, a data dictionary 2.3C that converts relevant transactional data into a common format, and a common transaction database 2.3D for storing the relevant transaction data.

More specifically, as directed by the POS process manager 2.3A, the POS connector 2.3B acquires transactional data from the POS TX DB 5 via one of three methods: 1) accessing a transaction log file on the POS host/controller 4; 2) establishing a direct connection with the POS TX DB 5 via POS host/controller 4; or 3) establishing a socket level connection with the POS host/controller 4 via a predetermined Internet protocol. The POS connector 2.3B may locally or remotely interface with the POS system (i.e., the POS terminal(s) 3; the POS host/controller 4, and the POS TX DB 5) via the POS host/controller 4 according to programmed time intervals or as directed by a user to acquire data from the POS system. In response to a query from the POS connector 2.3B, the POS host/controller 4 broadcasts transactional data within the POS system over the socket to a receiving program managed by the POS connector 2.3B. Data formats of disparate POS terminals are typically different from one another. Accordingly, once the transactional data is acquired from a particular POS system, the raw transactional data is written to a local file (not shown) on the computer 1 and is processed through a data dictionary 2.3C where it is converted into a common format (e.g., XML) useable by process modules within the software machine 2, as will be described in greater detail below. The data dictionary 2.3C is essentially a conversion reference that maps POS transaction data from one format to another. To accomplish this format translation, a unique map is constructed for each disparate data format. These unique maps are initiated and maintained via the setup and administration module 2.2 through the user interface 2.1, as will be discussed in greater detail with reference to FIG. 8. Once conversion to the common format is complete, the integrity of the commonly formatted (e.g., XML) transaction data is validated and checked for errors. The commonly formatted transaction data is then qualified against programmable criteria, specified via the user interface, to determine the whether the data corresponds to an event. The qualified transaction data is then written to a common format POS transaction database 2.3D, located in the storage and archival portion 2.5 of the software machine 2, for future use by an exception manager 2.6 portion of the software machine, as will be discussed in greater detail below.

Figure 5:
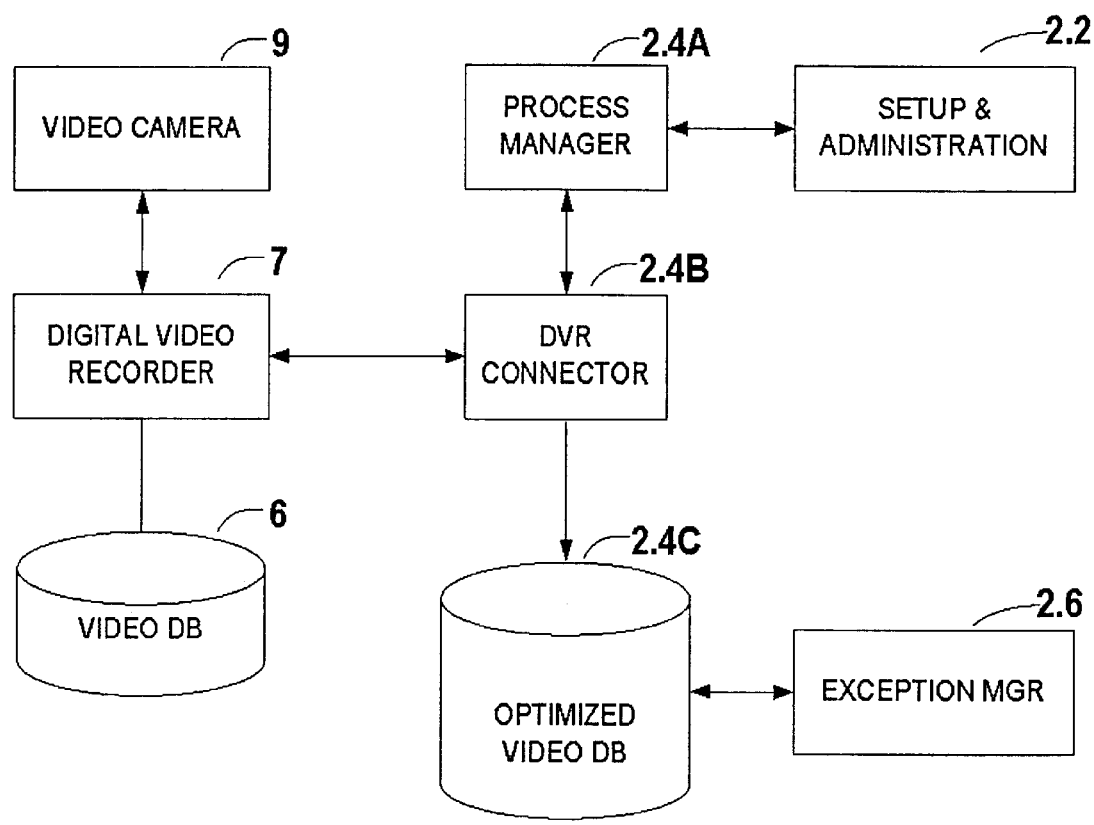
FIG. 5 is a schematic block diagram of the DVR interface portion of the software machine referenced in FIG. 3.

With reference to FIG. 5, the DVR interface 2.4 of the software machine 2 will now be discussed in greater detail.

Products that convert analog video signals to digital media are widely available. Digital video recording technology offers many advantages over conventional recording methods. Digital Video Recorder (DVR) systems may include computers equipped with specialized encoding equipment to produce and store digital video segments. As digital video signals are produced and stored within digital recording media (e.g., hard disk, etc.), corresponding timestamp information is also stored in a separate reference database. Additionally, correlated source information is stored with the timestamp information so that users of the system in the present invention can determine which video segment was generated by which video camera.

The present invention incorporates a flexible design accommodating open compatibility with pre-existing disparate DVR systems and operational methodologies. The DVR interface portion 2.4 of the software machine 2 generally includes a DVR process manager 2.4A, operating in a similar fashion as the POS process manager 2.3A in the POS interface 2.3, which oversees the operations of the DVR interface, a DVR connector 2.4B that acts as the primary means of acquiring digital video data from the video database 7 by managing a network connection with the DVR 6, and an optimized video database 2.4C for storing predetermined time segments of digital video, as will be discussed in greater detail below.

More specifically, as directed by the DVR process manager 2.4A, the DVR connector 2.4B manages a network connection (e.g., TCP/IP via Ethernet LAN topology) with the DVR 6 to acquire the predetermined time slices of digital video from the video database 7 via one of two methods: 1) establishing a direct connection to the database and file systems of the DVR 6; or 2) establishing programmatic requests to a software application running on the DVR 6. The DVR connector 2.4B maintains configuration files corresponding to either of the aforementioned video data acquisition methods and facilitates the interface and digital video data acquisition. According to the principles of the present invention, only a small subset of the video data stored on the DVR systems at any given time. Video segments of predetermined length from a specific camera source are pulled from the video database 7 and stored in the optimized video database 2.4C, located in the storage and archival portion 2.5 (See FIG. 3) of the software machine 2, for future use by the exception manager portion 2.6 and alternative input manager portion 2.7, as will be discussed in greater detail below.

Figure 6:
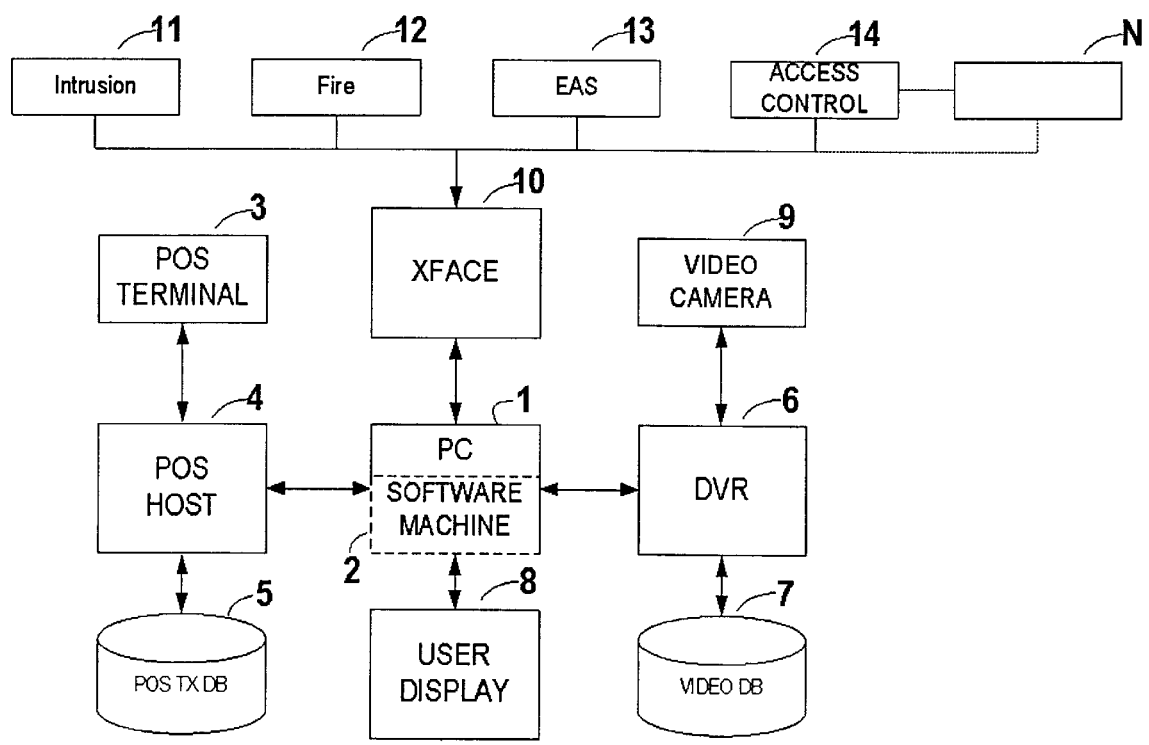
FIG. 6 is a schematic block diagram illustrating another configuration relating to alternative input systems according to another embodiment of the present invention.

Referring to another embodiment the present invention illustrated in FIG. 6 alternative input systems may provide supplemental inputs within the transactional environment.

Specifically, the present embodiment recognizes, and makes useable, the many other types of electronic systems other than POS systems that exist within the retail environment. The alternative input systems generally include sensor inputs which provide state information back to a central control system (e.g., the software machine 2 running on the computer 1) and are capable of generating a programmed output. These control systems are generally equipped with means of wired or wireless communications and they are capable of visual or auditory enumeration and usually have programmable relay outputs. An exemplary list of these alternative input systems include burglar and fire alarm systems, electronic article surveillance (EAS) systems, access control (AC) systems, telemetry systems, and the like. Accordingly, the software machine 2 may manage a network connection (e.g., Universal Serial Bus (USB), etc.) via an alternative input interface device 10 equipped with a plurality of programmable sensor inputs. Each of the plurality of programmable sensor inputs are, in turn, connected to relay outputs of the aforementioned alternative input systems 11, 12, 13, 14, . . . , n.

The software machine 2 manages configuration data for each of the sensor inputs via the user interface 2.1. Further action by the software machine 2 in regards to state changes of the sensor inputs on alternative input interface device 10 is managed via the alternate input manager portion 2.7 of the software machine shown in FIG. 3, as will be discussed in greater detail below.

Figure 7:
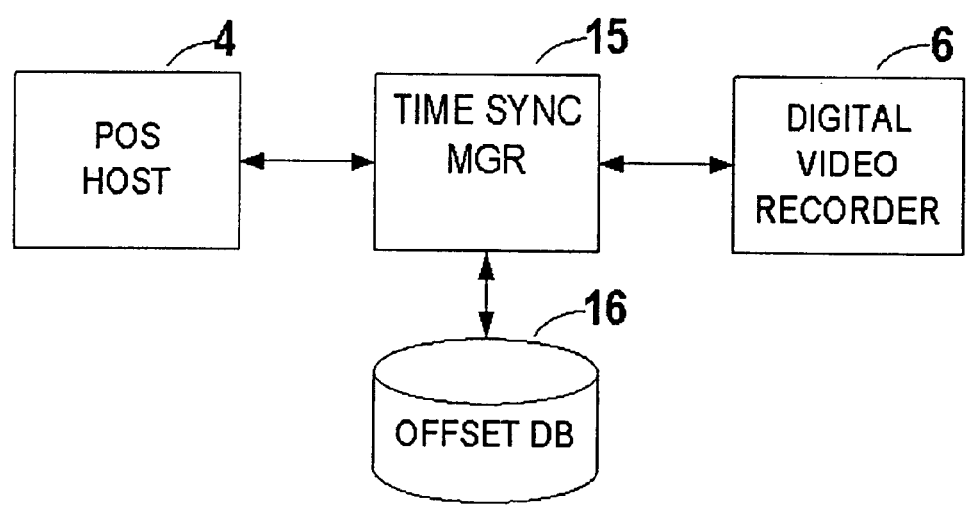
FIG. 7 is a schematic block diagram of the time synchronization portion of the software machine referenced in FIG. 3 according to one aspect of the present invention.

Referring now to FIG. 7, a schematic block diagram of the time synchronization manager is illustrated.

One aspect generally realized by the principles of the present invention includes the capability to integrate disparate systems typically operating by their own time sources. For example, POS host/controller 4, DVR 6, and the alternative input interface device 10 components within a transactional environment typically operate according to their own internally provided time source. The present invention provides the ability to accurately relate any required time signatures of a selected time segment of digital video with a time signature of a POS transactional event and/or state change event. In some cases, the act of relating of the time signatures further occurs after the POS transactional and/or state change event transpires. Accordingly, the present invention uses an offset approach to correlate time signatures of disparate systems within a transactional environment.

Specifically, and as described with reference to FIG. 6, the time synchronization manager 15 located on the computer 1 records a time signature from the POS host/controller 4 as well as from the DVR 6 and alternative input interface device 10 (not shown). The time synchronization manager 15 then records the time signatures from each system, along with a corresponding offset time from its own internal time source in the offset time database 16. Accordingly, a baseline time stamp maintained within the offset time database can be used to correlate the disparate systems within the transactional environment. In an exemplary aspect of the present invention, an offset time entry may be recorded every one minute, wherein a temporal resolution down to the second is available. Using the aforementioned offset time synchronization manager, any requirement for time correlated video and POS transaction data and/or alternative input data may be fulfilled within a reasonable degree of accuracy. The time source within the time synchronization manager 15 may be set, for example, by requesting the official time from the Naval Observatory via dial up or Internet connection on periodic intervals established by the users of the system via the user interface 2.1.

In an alternate aspect of the present invention, the synchronization of time signatures from the various aforementioned components within the transactional environment (e.g., POS host/controller 4, DVR 6, computer 1, alternative input interface device 10) may alternatively be correlated without the use of a time synchronization manager 15 or an offset time database 16. Accordingly, in this alternative aspect of the present invention, correlation of time signatures from disparate systems may be accomplished by appreciating the fact that all of the components, including the computer 1, within the transactional environment except for the POS host/controller may be provided to operate according to what is known in the art as Simple Network Time Protocol (SNTP). In order to correlate the time signature between the aforementioned components and the POS host/controller 4, a socket connection between the computer 1 and the POS host/controller 4 is established where the time signature of the POS host/controller 4 is broadcast to the computer 1. The computer 1, operating with a time source based on SNTP, then uses the broadcasted time signature as a basis for setting its own time source and, in turn, broadcasts the time signature of the POS host/controller 4 to the remaining components within the transactional environment so that the remaining components may then alter their time signatures to correspond to the POS host/controller time signature. Thus, regardless of the time or type of POS host/controller communicating with the software machine 2 on the computer 1, the time signature from the POS host/controller determines the time signatures of the components within the transactional environment. Accordingly, the need for a specialized time database or external verification of standard times is removed, allowing for a robust ability to synchronize the time signatures of disparate components within a transactional environment.

Figure 8:
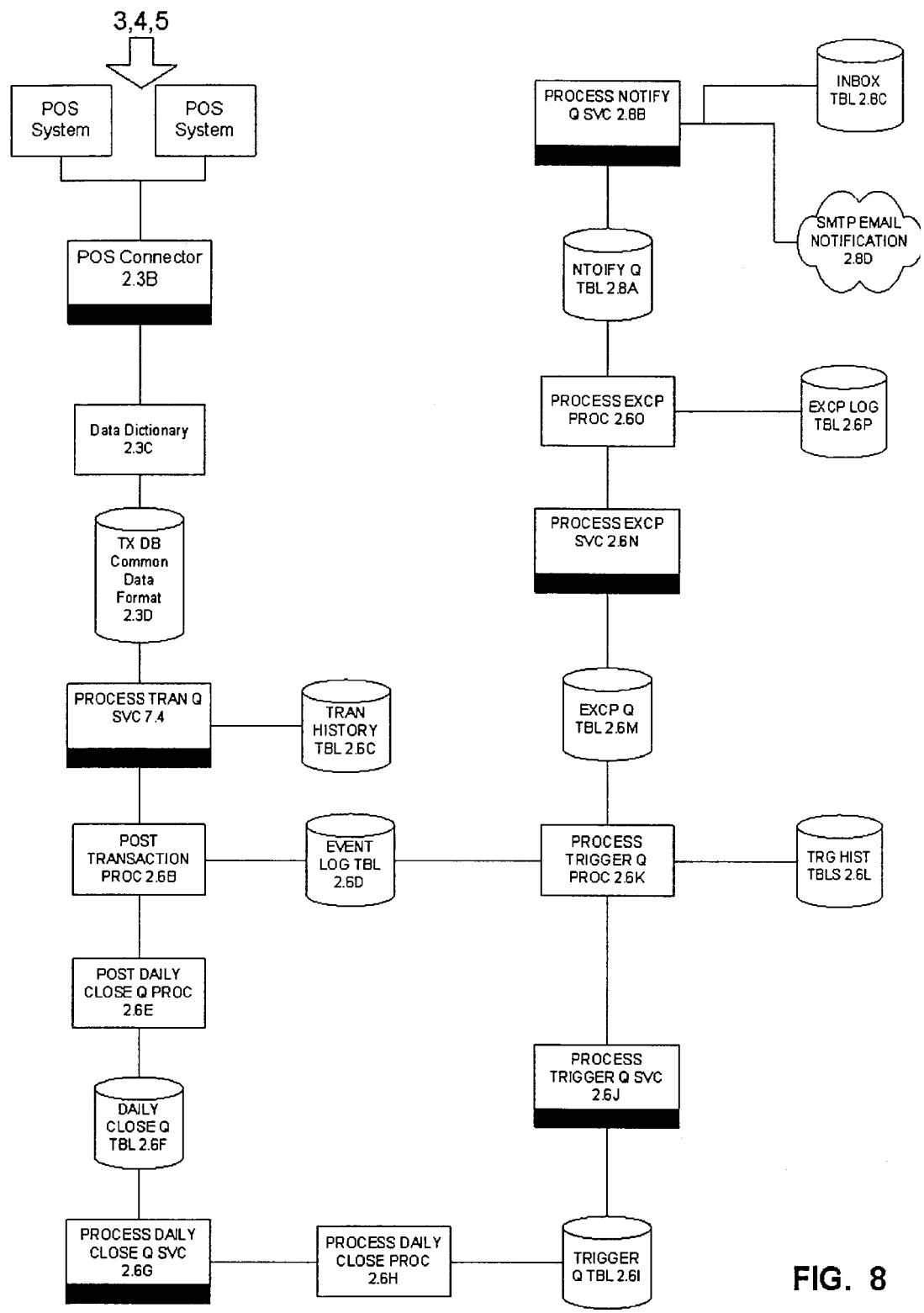
FIG. 8 illustrates a schematic block diagram of the exception manager portion of the software machine referenced in FIG. 3, and its relationship between the POS interface and the notification engine also referenced in FIG. 3.

Referring now to FIG. 8, a block diagram of the logic components within the exception manager portion 2.6 of the software machine 2 and its relationship with the POS interface portion 2.3 of the software machine including common format POS transaction database 2.3D are illustrated.

Conceptually, the exception manager 2.6 includes a plurality of core process modules including an event process module, a trigger process module, and an exception process module.

As used in the present disclosure an "event" is characterized according to an event definition. An event definition describes a particular behavior or occurrence that meets specific, user defined criteria created and maintained via the user interface 2.1. In one aspect of the invention, events may be data related to POS transactions (e.g., a manual override at register, a transaction void, a hand-keyed credit card, hand keyed gift card, price check scan, check over amount, no receipt return, multiple line scan items, etc.). Event definitions may be stored in an event definition database provided within the setup and administration portion 2.2 of the software machine 2, as will be discussed in greater detail below.

To determine what portions of the transaction data within the common format POS transaction database 2.3D correspond to any "event", a post transaction procedure 2.6B is used. The post transaction procedure is activated by a process transaction queue SVC 2.6A that runs as a background service on the computer 1, within the event process module of the exception manager 2.6. The process transaction queue SVC 2.6A runs according to programmed time intervals or as directed by a user. The post transaction processor parses the commonly formatted transaction data, posts POS event types found within the commonly formatted transaction data, and chronologically organizes the occurrence of events according to values of a predetermined temporal structure (e.g., month, day, year, hour, minute, second, shift schedules, etc. or combinations thereof). In one aspect of the present invention, the post transaction procedure 2.6B writes the parsed, posted, and organized data to a transaction history database 2.6C, located within the storage and archival portion 2.5 of the software machine, for future analysis. In another aspect of the present invention, the post transaction procedure writes POS events from the parsed, posted, and organized data as discrete events to a POS event log table 2.6D for subsequent analysis by the trigger process module, as will be discussed in greater detail below. Entries in the POS event log table 2.6D include key identifying information about the transaction or situation in which the event occurred. For example, identifying information pertaining to a POS event may include an event descriptor, transaction number, date/time stamp, operator ID, terminal ID, sale amount, tender type, and/or tender amount. Upon encountering a change in the value of the predetermined temporal structure within the commonly formatted transaction data, the post transaction procedure 2.6B initiates a period processing by calling a post period close queue procedure 2.6E. The post period close queue procedure 2.6E writes transaction data for open periods, which need to be processed, to a period close table 2.6F. Subsequently, a period close queue SVC 2.6G, running as a background service on the computer 1, according to either a programmable time interval or as directed by a user, calls a process period close procedure 2.6H. The process period close procedure is a stored procedure that generates entries for period processing into a trigger queue table 2.6I, within the trigger process module, as will be discussed in greater detail below.

As used in the present disclosure, the term "trigger" is characterized as a set of user defined parameters related to an event. Each trigger may be further characterized by a definition created and maintained by the user through the user interface 2.1. Each trigger definition may include components relating to period, group-by parameters, priority based on criticality of event, and/or quantity-threshold. As described above, a purpose of the present invention is directed to identify abnormal repetition or patterns of certain events that are indicative of fraud, theft, or inadequate training and that warrant investigation. Accordingly, a trigger definition may include user definable boundaries relating to events indicative of fraud, theft, etc., such as a threshold for a predetermined number of events occurring within a predetermined temporal period (e.g., a day). Other user-definable boundaries may be set in the trigger definition to achieve granular results of pattern analysis. For example, triggers for a POS related event may be defined as follows: all returns with a tender amount over $200 or more than 12 occurrences of a transaction void by the same operator within a 24 hour period. In the first example above, the threshold was "all" and the POS event was "tender amount over $200". In the second example above the threshold was "12" and the POS event was "transaction void" further qualified by "the same operator". Trigger definitions may be stored in a trigger definition database provided within the setup and administration portion 2.2 of the software machine 2, as will be discussed in greater detail below.

In the present invention, each trigger entry (provided by the user via the user interface 2.1) within the trigger queue table 2.6I may be processed against the entries within the event log table 2.6D. To accomplish this, a process trigger queue SVC 2.6J, running as a background service on the computer 1, calls a process trigger procedure 2.6K either according to predetermined time intervals or as directed by a user. The process trigger procedure then processes entries within the trigger queue table 2.6I against entries within the event log table. For each instance where criteria within a particular trigger definition is satisfied, a corresponding record is written to a trigger history table 2.6L, located within the storage and archival portion 2.5 of the software machine, for future analysis. When the trigger thresholds are exceeded, events corresponding to the exceeded thresholds are written to an exception queue table 2.6M for further processing within the exception process module, as will be discussed in greater detail below.

As used in the present disclosure, an event is an "exception" when criteria within a trigger definition has been met or exceeded. The term "exception" is used herein to refer to a database record containing references to the one or many events that satisfy a corresponding trigger definition. A process exception queue SVC 2.6N, running as a background service on the computer 1, calls a process exception procedure 2.6O and makes exception entries into a notification queue table 2.8A according to predetermined time intervals or as directed by a user. Additionally, the process exception procedure makes entries of exceptions into the exception log table 2.6P, located within the storage and archival portion 2.5 of the software machine, for archival reference and into an image queue table (not shown). Entries made into the image queue table may then be processed according to one or more instructions set forth within parameters defined by an exception definition (e.g., video pull instructions and notification instructions). Further, exception definitions may be specified by the user via the user interface 2.1.

Video pull instructions direct the DVR connector 2.4B to pull a predetermined time segment of video from the video database 7 for each event referenced by the exception where it is then stored in an optimized video database 2.4C, thereby allowing users to associate a video with transaction activity. For example, wavelet technology may be used to achieve high compression ratios to maximize media storage space. Wavelet compressed data may be converted to an optimized streaming format which automatically adjusts a data transmission throughput based on a network connection speed. Web-optimized thumbnails and streaming MPEG-4 video may be alternatively used to replace wavelet technology and optimize bandwidth over the local or remote network.

Still referring to FIG. 8, notification instructions direct the process notify queue SVC 2.8B, running as a background service on the computer 1 and according to programmable intervals or as otherwise directed by a user, to process entries from the notify queue table 2.8A. Further, according to the notification instructions, the process notify queue SVC 2.8B notifies users that an exception has been detected by making entries in an inbox table 2.8C and/or sending email notification via a standard SMTP service. Notification instructions may direct the delivery of exception notifications to individuals or groups of individuals based on components of the trigger definitions. Notification instructions may be provided within a notification setup module within the setup and administration portion 2.2 of the software machine 2, as will be discussed in greater detail below. The results of this entire process are delivered to the user proactively (not requiring a manual query).

Figure 9:
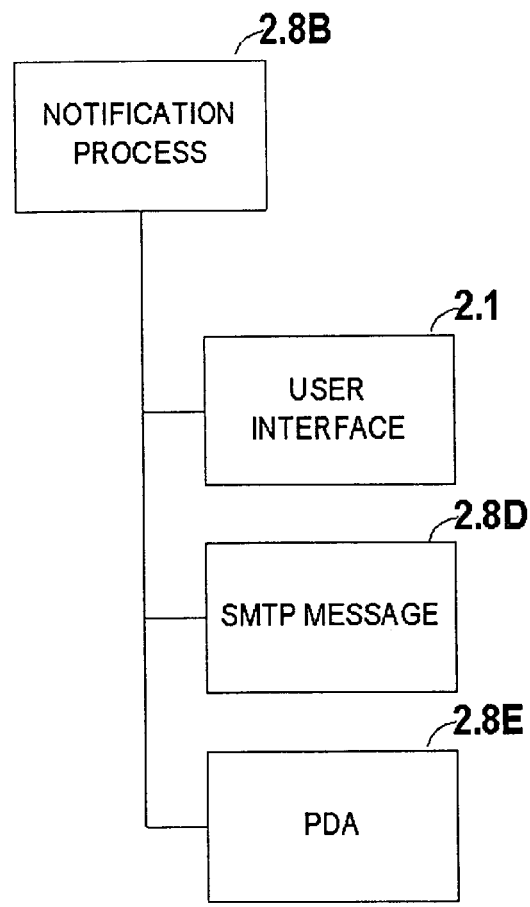
FIG. 9 is a schematic block diagram of the notification engine portion of the software machine referenced in FIG. 3.

More specifically, notification instructions are processed within the notification engine 2.8 of the software machine 2. FIG. 9 illustrates a detailed schematic block diagram of the notification engine. Notification of exceptions may be provided through many methods. For example, notification may be provided visually through the user interface 2.1 (e.g., a small "mail" icon may flash in a prominent spot on the user interface indicating a new exception available for viewing), may be sent electronically via an external delivery mechanism (e.g., an SMTP message 2.8D, email) to predetermined users of the system, or may be sent to a Personal Digital Assistant (PDA) 2.8E through a standard wired or wireless interface. The contents of such notifications may incorporate a means to link an external user back to the system if a proper network connection is made available.

Figure 10:
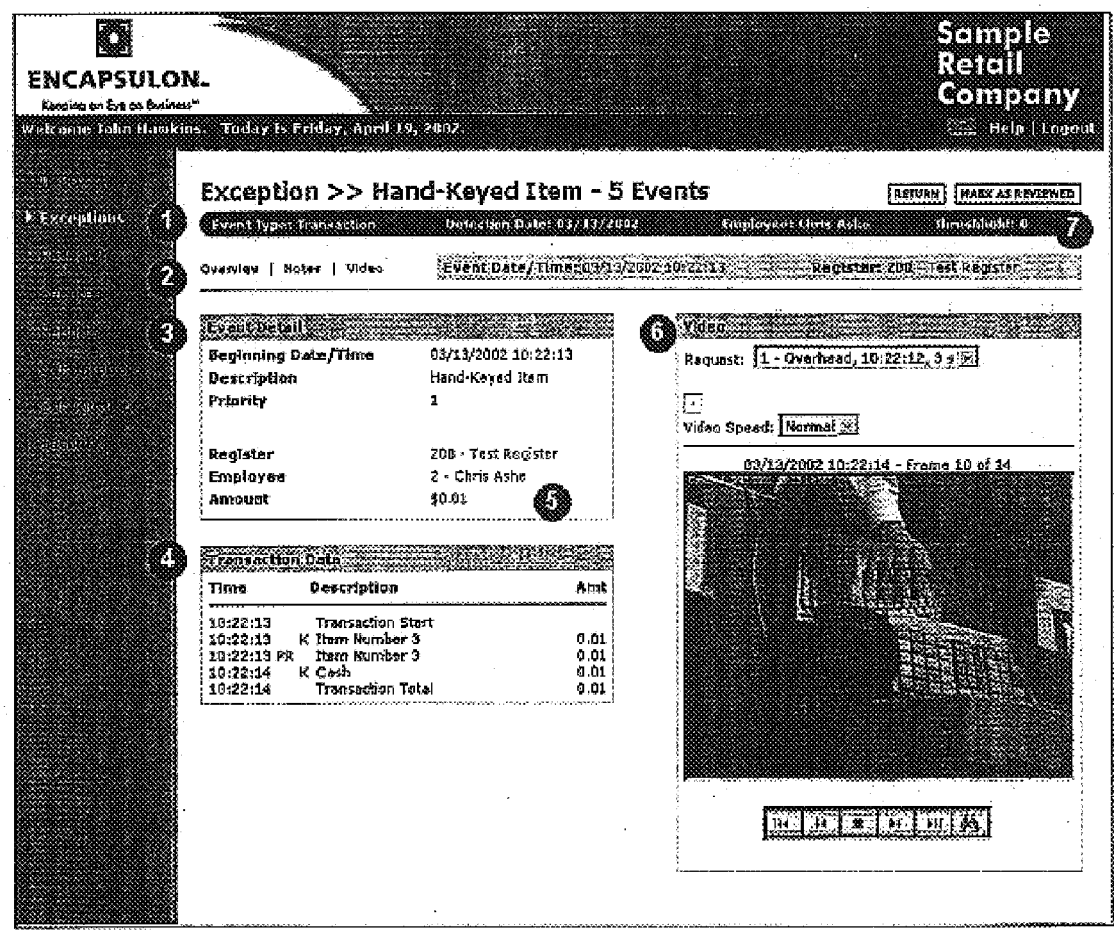
FIG. 10 illustrates an exception notification according to one aspect of the present invention.

As shown in FIG. 10, an "exception" may be viewed on a browser interface and contain information on an employee involved in the event, the type of event itself, the date, time, location the event took place, an exception reference ID, and appropriate links to view video images correlated with the event in the exception.

According to another embodiment, an "event" may additionally include data related to state changes input from the alternative input interface device 10. In one aspect of the present invention, the events may be data related to state changes in the alternative input devices 11, 12, 13, etc. (e.g., contact closure on a relay because a fire or a burglar was detected, etc.).

Accordingly, and in a similar fashion as described above with respect to POS "events", upon generation of state change events, a state change processor writes information pertaining to the state change information to a state change log table (not shown) for subsequent analysis by the trigger process module. Entries in the state log table include key identifying information about the state change or situation in which the event occurred. For example, identifying information pertaining to state change events may include the type of alternative input device ID, date/time stamp, location ID, etc.

Figure 11:
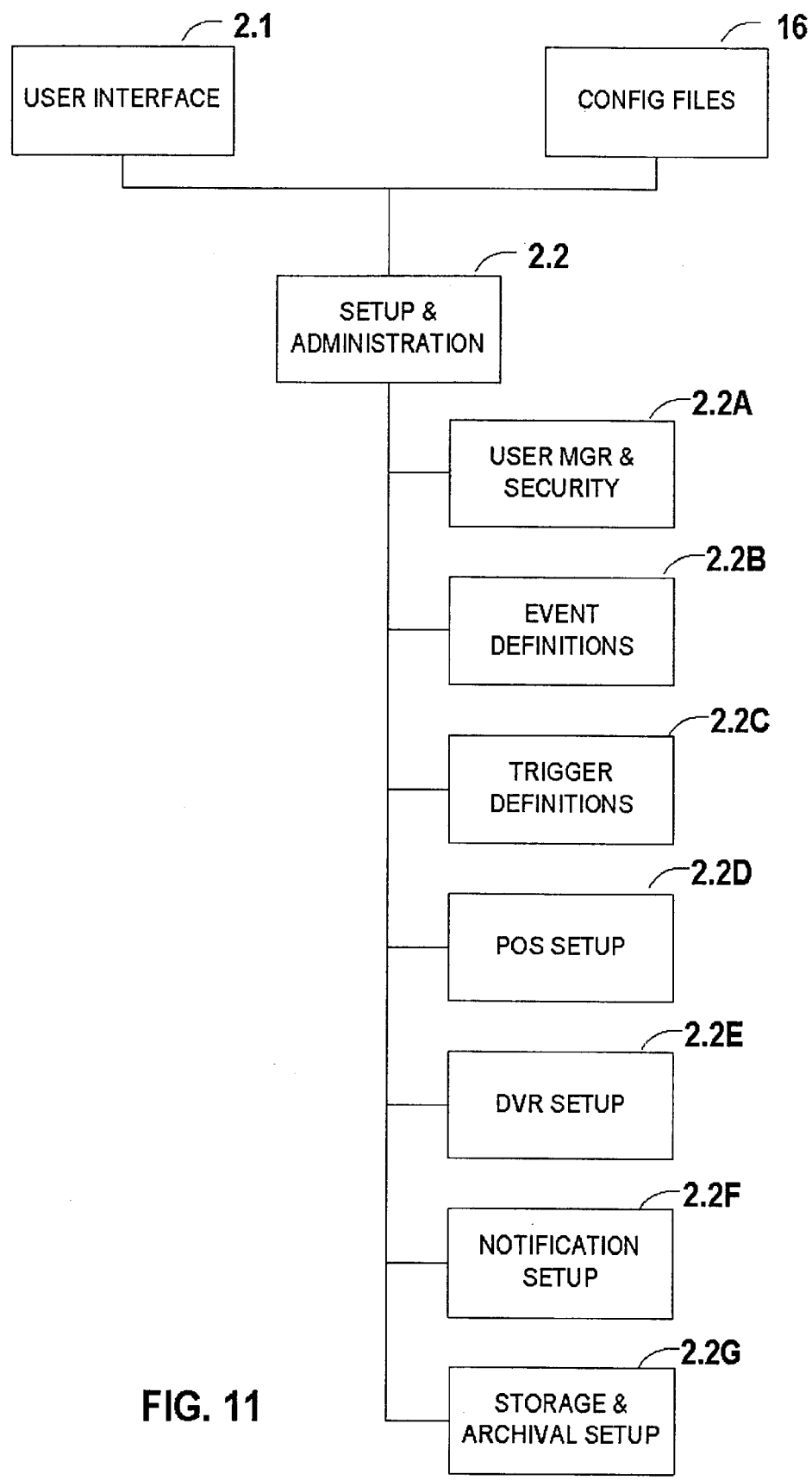
FIG. 11 is a schematic block diagram of the setup and maintenance portion of the software machine referenced in FIG. 3.

FIG. 11 illustrates a schematic block diagram of the setup and administration portion 2.2 of the software machine referenced in FIG. 3.

The system and method of the present invention requires the setup and administration of many parameters for proper configuration and operation. These parameters are stored in database tables and/or configuration files 16 on a local or remote storage media (e.g., a hard drive) supporting the monitoring system. Access to configuration files is achieved via a standard operating system user interface while access to the database tables is achieved via user interface 2.1. The collection of database tables and configuration files used to store setup and operating parameters include user manager and security module 2.2A, event definition database 2.2B, trigger definition database 2.2C, POS setup module 2.2D, DVR setup module 2.2E, notification setup 2.2F, and storage and archival module setup 2.2E, all herein generically referred to as "application data".

The user manager and security module 2.2A is designed to scale both horizontally and vertically to accommodate distinct chains of access authority within the transactional environment. In one aspect of the present invention, the user manager and security module is provided as an application using 128 bit encryption via SSL. Users may be authenticated at a login stage and may be required to enter three items of identification including, for example, store ID, user ID, and password. Security within the application may be administered via permission assignments to users and groups.

Figure 12:
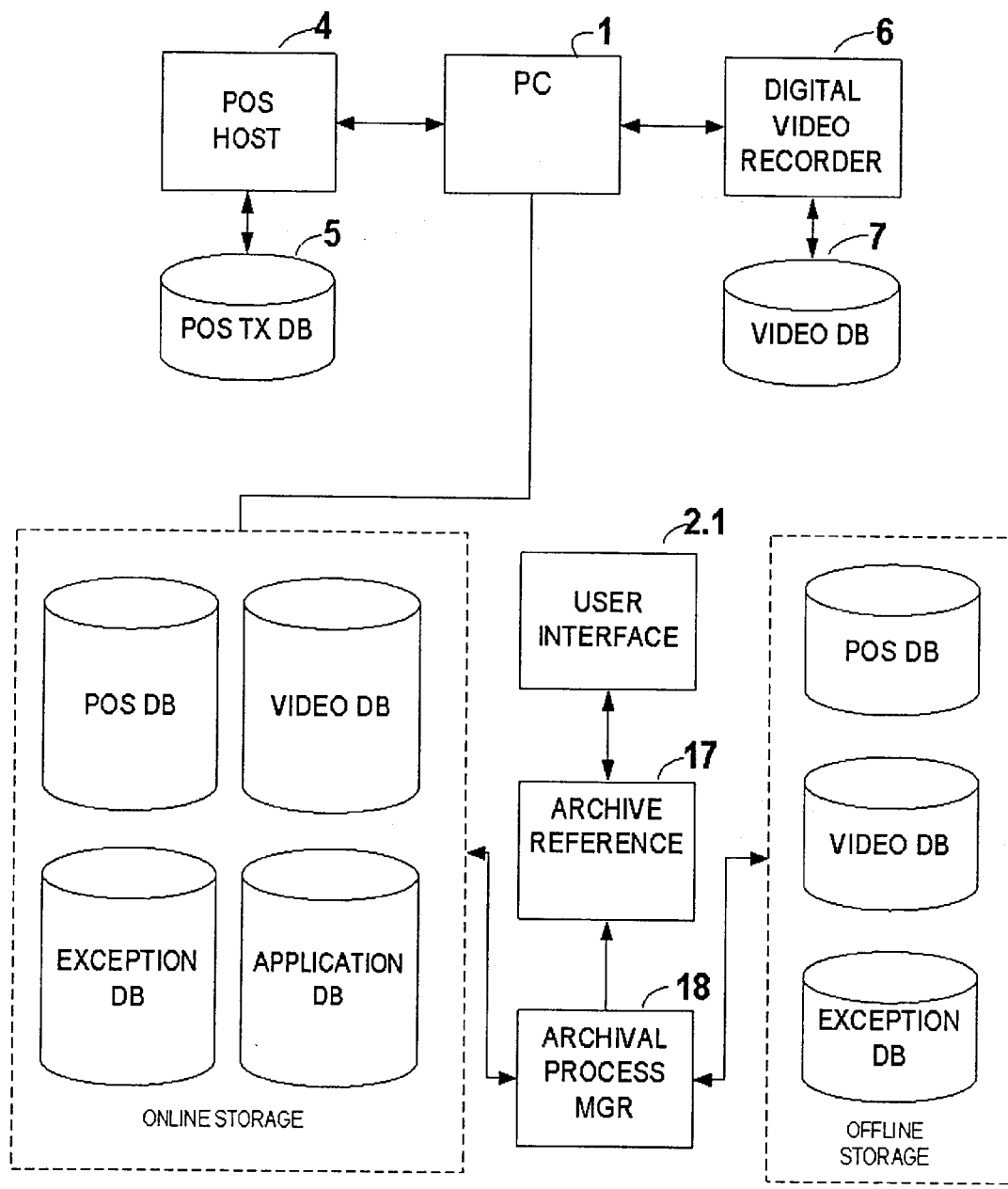
FIG. 12 is a schematic block diagram of the storage and archival portion of the software machine referenced in FIG. 3.

FIG. 12 illustrates a schematic block diagram of the storage and archival portion 2.5 of the software machine 2 referenced in FIG. 3.

In one aspect of the present invention the ability to store and archive POS application data, DVR, and exception data and other types of application systems data, either online or offline, is provided. Accordingly, access may be provided by the user interface 2.1 to online or offline archive and storage databases. Online or offline access to POS data, DVR data, exception data, and application data is managed through an archival process manager 18 and an archive reference module 17 that communicates with the user interface 2.1.

Accordingly, the principles of the present invention may provide functions to prevent losses within a retail environment, as already discussed in detail above. However, the principles of the present invention are instantly translatable as tools toward merchandising and marketing research of products, transactional environment, customer service effects, etc. In one aspect of the present invention, existing video surveillance systems may be directed toward consumers participating in a transactional event. Accordingly, the aforementioned POS transactional data may be coupled to video of actual consumers at the point of sale to provide marketing research tools. Such a marketing research tool would enable businesses to define their target audiences for specific products using extremely accurate and reliable data, thereby eliminating the need for time consuming surveys or test groups.

According to the principles of the present invention, exception analysis of point-of-sale transactional data may be combined with recorded digital video. Accordingly, the present invention has the capability to optimize the amount of time spent by loss prevention managers and security officers to pinpoint fraud within a transactional environment.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for detecting fraud in a transactional environment, comprising:

capturing video data of behavioral events corresponding to a predetermined transaction;

storing the captured video data in a first predetermined storage medium;

generating data corresponding to the predetermined transaction;

storing the generated data in a second predetermined storage medium;

determining event occurrences within the generated data; and proactively generating a user-defined exception when a number of events within the generated data exceeds a predetermined threshold number of events, the user-defined exception comprising:

selected time-synchronized data within the generated data with respect to the determined event occurrences; and a portion of the stored video signals corresponding to a predetermined amount of time corresponding to the determined event occurrences.

2. A method of managing events in a transactional environment, said method comprising the following steps:

interfacing a plurality of electronic systems to a central computerized platform, said plurality of electronic systems including at least one point-of-sale (POS) system for providing transaction data indicative of sales in the transactional environment, and at least one video recording system for providing video signals generated within one or more retail locations associated with the transactional environment;

receiving and interfacing at least one datastream from each of the plurality of electronic systems to yield a collection of assembled data, said assembled data including transaction data from said at least one POS system and video data from said at least one video recording system;

synchronizing time signatures associated with each of the plurality of electronic systems, whereby all datastreams received from the plurality of electronic systems are formulated relative to a single time reference;

sorting and organizing the transaction data from the plurality of electronic systems to formulate a collection of discrete events;

comparing the events formulated in said step of sorting and organizing to one or more predetermined event definitions;

pro-actively identifying as transaction exceptions when the events formulated in said step of sorting and organizing meet or exceed the one or more predetermined event definitions provided in said comparing step;

correlating video data having the same time signatures as selected of the transaction exceptions with the transaction data corresponding to the selected of the transaction exceptions; and providing notification to a user of the identified transaction exceptions.

3. The method of managing events in a transactional environment as in claim 2, wherein said notification to a user comprises both transaction data and video data associated with said selected of the transaction exceptions.

4. The method of managing events in a transactional environment as in claim 2, wherein said step of sorting and organizing the transaction data comprises parsing commonly formatted data collected from the plurality of electronic systems, posting events identified within the commonly formatted data to an associated storage medium, and chronologically organizing the occurrence of events according to values of a predetermined temporal structure.

5. The method of managing events in a transactional environment as in claim 2, wherein the one or more predetermined event definitions of said comparing step are created and maintained by a user via an accessible user interface.

6. The method of managing events in a transactional environment as in claim 2, wherein said method is performed via web-based software provided on one or more remote computer systems.

7. The method of managing events in a transactional environment as in claim 2, wherein said step of providing notification to a user comprises providing notification information to a user via a visual user display.

8. The method of managing events in a transactional environment as in claim 2, wherein said step of providing notification to a user comprises providing an electronic message via an external message delivery system.

9. The method of managing events in a transactional environment as in claim 2, wherein said step of providing notification to a user comprises relaying notification information to a Personal Digital Assistant (PDA).

10. The method of managing events in a transactional environment as in claim 2, further comprising a step of storing the transaction data and correlated video date corresponding to selected of the identified transaction exceptions in an associated storage medium.

11. A method of detecting and managing data events from a plurality of electronic systems, said method comprising the following steps:

coupling each of a plurality of electronic systems to a central control system;

receiving and interfacing at least one datastream from each of the plurality of electronic systems to yield a collection of assembled data;

sorting and organizing the assembled data from the plurality of electronic systems to formulate a collection of discrete events, wherein the discrete events are independent from the assembled data and are relayed to a dedicated storage medium;

comparing the events formulated in said step of sorting and organizing to one or more predetermined event definitions;

pro-actively identifying as exceptions when the events formulated in said step of sorting and organizing meet or exceed the one or more predetermined event definitions provided in said comparing step;

correlating supplemental time-synchronized data to selected of the identified exceptions; and providing notification to a user of the identified exceptions.

12. The method of detecting and managing data events as in claim 11, further comprising a step of synchronizing time signatures associated with each of the plurality of electronic systems, whereby any different respective time sources on which each of the plurality of electronic systems operates is integrated as a single time reference.

13. The method of detecting and managing data events as in claim 11, wherein said step of sorting and organizing the assembled data comprises parsing commonly formatted data collected from the plurality of electronic systems, posting events identified within the commonly formatted data to an associated storage medium, and chronologically organizing the occurrence of events according to values of a predetermined temporal structure.

14. The method of detecting and managing events as in claim 11, wherein the one or more predetermined event definitions of said comparing step are created and maintained by a user via an accessible user interface.

15. The method of detecting and managing events as in claim 11, wherein each of said plurality of electronic devices includes one of a point of sale (POS) system, a video recording system, a burglar/alarm system, an electronic article surveillance system, an access control system, or a telemetry system.

16. The method of detecting and managing events as in claim 11, wherein said method is performed via web-based software provided on one or more remote computer systems.

17. The method of detecting and managing events as in claim 11, wherein said step of providing notification to a user comprises providing notification information to a user via a visual user display.

18. The method of detecting and managing events as in claim 11, wherein said step of providing notification to a user comprises providing an electronic message via an external message delivery system.

19. The method of detecting and managing events as in claim 11, wherein said step of providing notification to a user comprises relaying notification information to a Personal Digital Assistant (PDA).

20. A computer-based platform for integrating a plurality of electronic systems and correlating information outputs therefrom, said computer-based platform comprising:

at least one interface module for establishing a connection between the computer-based platform and selected of the plurality of electronic systems and for obtaining data from said selected of the plurality of electronic systems;

a user interface for creating and maintaining user-defined criteria for characterizing the data from said plurality of electronic systems and for defining one or more event type associated with the data received from said plurality of electronic systems;

a data-processing procedure for transforming the data from said plurality of electronic systems into a common format, parsing the commonly formatted data collected from said plurality of electronic systems, and posting independent data events identified within the commonly formatted data to an associated storage medium;

an exception manager for determining when events identified via the data-processing procedure meet or exceed a trigger definition, thus corresponding to an exception; and a notification engine for proactively relaying notification information regarding selected events and exceptions to a user.

21. The computer-based platform of claim 20, wherein each of said plurality of electronic devices includes one of a point of sale (POS) system, a video recording system, a burglar/alarm system, an electronic article surveillance system, an access control system, or a telemetry system.

22. The computer-based platform of claim 20, wherein said computer-based platform runs on one or more user displays.

23. The computer-based platform of claim 22, wherein the computer-based platform runs on multiple user displays connected via a local network connection.

24. The computer-based platform of claim 22, wherein the computer-based platform runs on multiple user displays connected via a remote network connection.

25. The computer-based platform of claim 24, wherein the remote network connection is a TCP/IP Internet connection.

26. The computer-based platform of claim 20, wherein said data processing procedure is further configured to chronologically organize the occurrence of events according to values of a predetermined temporal structure.

27. The computer-based platform of claim 20, further comprising a setup and administration interface for providing secure access to and configuration ability of operational parameters associated with the computer-based platform.

28. The computer-based platform of claim 20, wherein the notification information relayed via said notification engine is provided via a visual user interface.

29. The computer-based platform of claim 20, wherein the notification information relayed via said notification engine is provided electronically via an external message delivery system.

30. The computer-based platform of claim 20, wherein the notification information relayed via said notification engine is provided to a Personal Digital Assistant (PDA).

31. The computer-based platform of claim 20, wherein said computer-based platform is implemented in a transactional environment, wherein said at least one interface module comprises a point-of-sale (POS) interface for coupling transaction data indicative of sales in the transactional environment, and wherein said computer-based platform further comprises a video recording interface for digitally coupling video signals generated within a retail location associated with the transactional environment.

* * * * *